United States Patent
Aboumrad

(10) Patent No.: US 11,801,744 B2
(45) Date of Patent: Oct. 31, 2023

(54) HYBRID MOWER WITH ELECTRIC BLADE CONTROL SYSTEM

(71) Applicant: Delta Systems, Inc., Streetsboro, OH (US)

(72) Inventor: Tony Aboumrad, North Royalton, OH (US)

(73) Assignee: Delta Systems, Inc., Streetsboro, OH (US)

( * ) Notice: Subject to any disclaimer, the term of this patent is extended or adjusted under 35 U.S.C. 154(b) by 54 days.

(21) Appl. No.: 17/518,842

(22) Filed: Nov. 4, 2021

(65) Prior Publication Data

US 2022/0089012 A1 Mar. 24, 2022

Related U.S. Application Data

(62) Division of application No. 16/239,275, filed on Jan. 3, 2019, now Pat. No. 11,173,780.

(Continued)

(51) Int. Cl.
*B60K 6/42* (2007.10)
*A01D 34/78* (2006.01)
(Continued)

(52) U.S. Cl.
CPC .............. *B60K 6/42* (2013.01); *A01D 34/006* (2013.01); *A01D 34/008* (2013.01); *A01D 34/66* (2013.01); *A01D 34/78* (2013.01); *A01D 69/02* (2013.01); *A01D 69/025* (2013.01); *B60K 6/20* (2013.01); *B60L 3/00* (2013.01); *B60W 10/08* (2013.01); *B60W 20/00* (2013.01); *B60W 30/1888* (2013.01); *B60W 2300/156* (2013.01)

(58) Field of Classification Search
CPC ... B60K 6/42; B60K 6/20; B60L 3/00; B60W 10/08; B60W 20/00; B60W 30/1888; B60W 2300/156; A01D 34/006; A01D 34/008; A01D 34/66; A01D 34/78; A01D 69/02; A01D 69/025
See application file for complete search history.

(56) References Cited

U.S. PATENT DOCUMENTS

| | | |
|---|---|---|
| 3,719,881 A | 3/1973 | Shibata et al. |
| 5,502,957 A | 4/1996 | Robertson |

(Continued)

FOREIGN PATENT DOCUMENTS

JP 2021168601 A * 10/2021 ............. A01D 34/64

*Primary Examiner* — Arpad F Kovacs

(57) ABSTRACT

A hybrid mower includes a chassis coupled to a body. The chassis has a plurality of wheels coupled to a steering assembly for navigating directional control. The mower also includes an internal combustion engine disposed on the chassis. The internal combustion engine is coupled to a drive assembly providing rotational operation to at least one of the plurality of wheels. The mower further includes a mower deck housing at least one rotatable blade for cutting undesired undergrowth during operation and an electric blade control system. The electric blade control system has an electronic control unit for enabling the at least one rotatable blade during operation and at least one direct current motor positioned about the mower deck and in communication with the electronic control unit. The at least one direct current motor has a motor shaft coupled to the at least one rotatable blade.

20 Claims, 10 Drawing Sheets

Related U.S. Application Data

(60) Provisional application No. 62/613,513, filed on Jan. 4, 2018.

(51) Int. Cl.

| | | |
|---|---|---|
| *A01D 34/00* | (2006.01) | |
| *A01D 34/66* | (2006.01) | |
| *A01D 69/02* | (2006.01) | |
| *B60K 6/20* | (2007.10) | |
| *B60W 10/08* | (2006.01) | |
| *B60W 20/00* | (2016.01) | |
| *B60L 3/00* | (2019.01) | |
| *B60W 30/188* | (2012.01) | |

(56) References Cited

U.S. PATENT DOCUMENTS

| | | |
|---|---|---|
| 5,794,422 A | 8/1998 | Reimers et al. |
| 5,934,051 A | 8/1999 | Hahn |
| 6,082,084 A | 7/2000 | Reimers et al. |
| 6,230,089 B1 | 5/2001 | Lonn et al. |
| 6,524,217 B1 | 2/2003 | Murakami et al. |
| 6,591,593 B1 | 7/2003 | Brandon et al. |
| 6,717,281 B1 | 4/2004 | Brandon et al. |
| 6,948,299 B2 | 9/2005 | Osborne |
| 7,017,327 B2 | 3/2006 | Hunt et al. |
| 7,479,754 B2 | 1/2009 | Lucas et al. |
| 7,482,768 B2 | 1/2009 | Lucas et al. |
| 7,610,975 B1 | 11/2009 | Gust et al. |
| 7,728,534 B2 | 6/2010 | Lucas et al. |
| 8,055,399 B2 | 11/2011 | Wyatt et al. |
| 8,450,953 B2 | 5/2013 | Hauser et al. |
| 8,863,485 B2 | 10/2014 | Pitcel et al. |
| 9,173,346 B2 | 11/2015 | Koike et al. |
| 9,226,444 B2 | 1/2016 | Schygge et al. |
| 9,301,443 B2 * | 4/2016 | Hashima ............... A01D 34/006 |
| 9,499,199 B1 | 11/2016 | Laymon et al. |
| 9,872,438 B2 | 1/2018 | Eavenson, Sr. et al. |
| 9,968,031 B2 | 5/2018 | Bejcek et al. |
| 10,562,567 B2 * | 2/2020 | Koike ..................... B62D 11/04 |
| 10,821,854 B2 * | 11/2020 | Ito .......................... B60L 15/025 |
| 10,869,425 B1 | 12/2020 | Siudyla et al. |
| 2007/0216312 A1 * | 9/2007 | Ogata ...................... B60K 6/48 |
| | | 315/131 |
| 2008/0039974 A1 | 2/2008 | Sandin et al. |
| 2008/0234096 A1 | 9/2008 | Joshi et al. |
| 2012/0159916 A1 | 6/2012 | Ishii et al. |
| 2012/0227368 A1 * | 9/2012 | Koike ..................... A01D 69/02 |
| | | 56/10.2 A |
| 2012/0227369 A1 * | 9/2012 | Koike ..................... B60L 1/003 |
| | | 318/474 |
| 2012/0323420 A1 | 12/2012 | Koike et al. |
| 2013/0054070 A1 | 2/2013 | Nakagawa |
| 2014/0062352 A1 * | 3/2014 | Wang ...................... H02P 1/021 |
| | | 318/139 |
| 2015/0120148 A1 * | 4/2015 | Henson ............. B60W 30/1886 |
| | | 701/48 |
| 2018/0148040 A1 * | 5/2018 | Kamatani ............... B60K 6/445 |
| 2018/0303027 A1 | 10/2018 | Koike et al. |
| 2018/0304881 A1 * | 10/2018 | Okabe ..................... B60W 20/00 |
| 2018/0326860 A1 | 11/2018 | Ito et al. |
| 2019/0075724 A1 * | 3/2019 | Becke ..................... A01D 69/02 |
| 2019/0291779 A1 * | 9/2019 | Zeiler ...................... B60K 1/02 |
| 2019/0387670 A1 * | 12/2019 | Matsuda ........... B60W 60/0053 |
| 2022/0354049 A1 * | 11/2022 | Zeiler ..................... A01D 34/006 |

\* cited by examiner

HYBRID MOWER WITH ELECTRIC BLADE CONTROL SYSTEM

CROSS REFERENCES TO RELATED APPLICATIONS

The present application is a divisional application claiming priority under 35 U.S.C. § 121 to co-pending U.S. nonprovisional application Ser. No. 16/239,275 that was filed on Jan. 3, 2019 and was published on Jul. 4, 2019 as U.S. Patent Pub. number 2019-0200521 entitled HYBRID MOWER WITH ELECTRIC BLADE CONTROL SYSTEM which was a non-provisional application filed under 35 U.S.C. § 111 claiming priority under 35 U.S.C. § 119(e) to U.S. Provisional Patent Application Ser. No. 62/613,513 filed Jan. 4, 2018 entitled HYBRID MOWER WITH ELECTRIC BLADE CONTROL SYSTEM. The above-identified applications are incorporated herein by reference in their entireties for all purposes.

TECHNICAL FIELD

The present disclosure relates generally to a hybrid mower, and more specifically, a hybrid mower with an electric blade control system that eliminates the need of conventional mechanical components.

BACKGROUND

Traditionally, gas powered riding mowers and gas powered zero-turn mowers (collectively "mowers") use a combination of a clutch, belts, pulleys, and spindles (see FIGS. 1 and 2) that are mechanically coupled to a power-take-off shaft of an engine to control and drive the operation of the blades used to cut, for example, weeds, shrubs, small trees, and/or grass (collectively "undergrowth"). Such mechanically moving parts, particularly the belts, tend to wear quickly in the field, resulting in high repair, replacement, and warranty costs. Additionally, such mechanical parts are time consuming to replace and repair.

Inefficiencies are also experienced in the production of such mowers, that is, the high number of parts forming the conventional mechanical mower systems are expensive to manage and inventory, as well as, cumbersome and time consuming during the installation/assembly process. The conventional mechanical systems, illustrated in FIGS. 1 and 2, directly couple the cutting blades to the engine through a power-take-off shaft. As such, the operation of the blades places an additional demand on the engine, often requiring the engine to operate at an excessively high throttle or RPM level to prevent the engine from stalling whenever the blades are operating to cut thick or heavy undergrowth.

SUMMARY

One example embodiment of the present disclosure includes hybrid mower having a chassis coupled to a body. The chassis has a plurality of wheels coupled to a steering assembly for navigating directional control. The mower also includes an internal combustion engine disposed on the chassis. The internal combustion engine is coupled to a drive assembly providing rotational operation to at least one of the plurality of wheels. The mower further includes a mower deck housing at least one rotatable blade for cutting undesired undergrowth during operation. The mower has an electric blade control system. The electric blade control system includes an electronic control unit for enabling the at least one rotatable blade during operation and at least one direct current motor positioned about the mower deck and is in communication with the electronic control unit. The at least one direct current motor has a motor shaft coupled to the at least one rotatable blade Another example embodiment of the present disclosure includes hybrid mower replacement unit for installing into a mower comprising at least one direct current motor having a motor shaft, the motor shaft for coupling to one rotatable blade for cutting undesired undergrowth during operation, the at least one direct current motor for positioning about a mower deck supported by a chassis coupled to a body, the chassis having a plurality of wheels coupled to a steering assembly for navigating directional control, wherein an internal combustion engine disposed on said chassis, the internal combustion engine coupled to a drive assembly providing rotational operation to at least one of said plurality of wheels, an electronic control unit for enabling the at least one motor shaft during operation, wherein the electronic control unit is in communication with the direct current motor, further wherein the electronic control unit is for controlling a current flow from at least one of a power unit and power supply.

Yet another example embodiment of the present disclosure includes a method installing of hybrid mower replacement unit for into a mower, the method comprising removing an existing gas powered mower unit from a deck of a mower and removing at least one existing rotatable blade from the existing gas powered mower, installing a hybrid mower replacement unit comprising installing at least one direct current motor having a motor shaft at least one of underneath or through the deck, installing at least one of an electronic control unit having a blade monitoring system and the blade monitoring system onto an existing electronic control unit of the mower, coupling at least one of a power supply and a power unit to the at least one direct current motor via the electronic control unit, wherein the electronic control unit controls a current flow to the at least one direct current motor, and installing one or more sensors to monitor a RPM of the motor shaft and one or more sensors for monitoring the power unit output. The method further comprises, attaching the at least one existing rotatable blade to respective motor shafts of the one or more direct current motors.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

Figure 1:
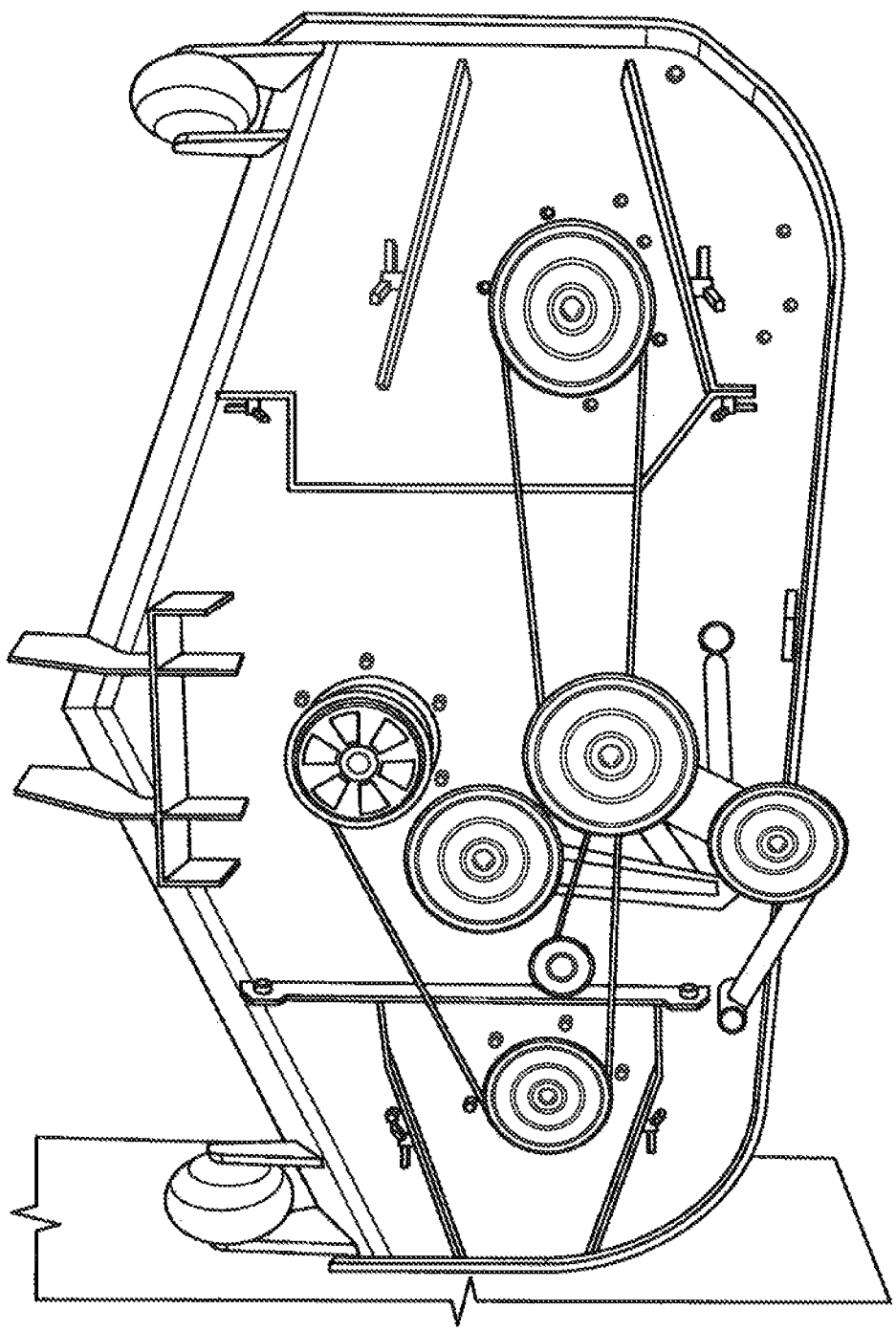
FIG. 1 is a conventional mechanical system gas mower deck.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures wherein like numbered features shown therein refer to like elements throughout unless otherwise noted. The present disclosure relates generally to a hybrid mower, and more specifically, a hybrid mower with an electric blade control system that eliminates the need of conventional mechanical components.

Figure 4:
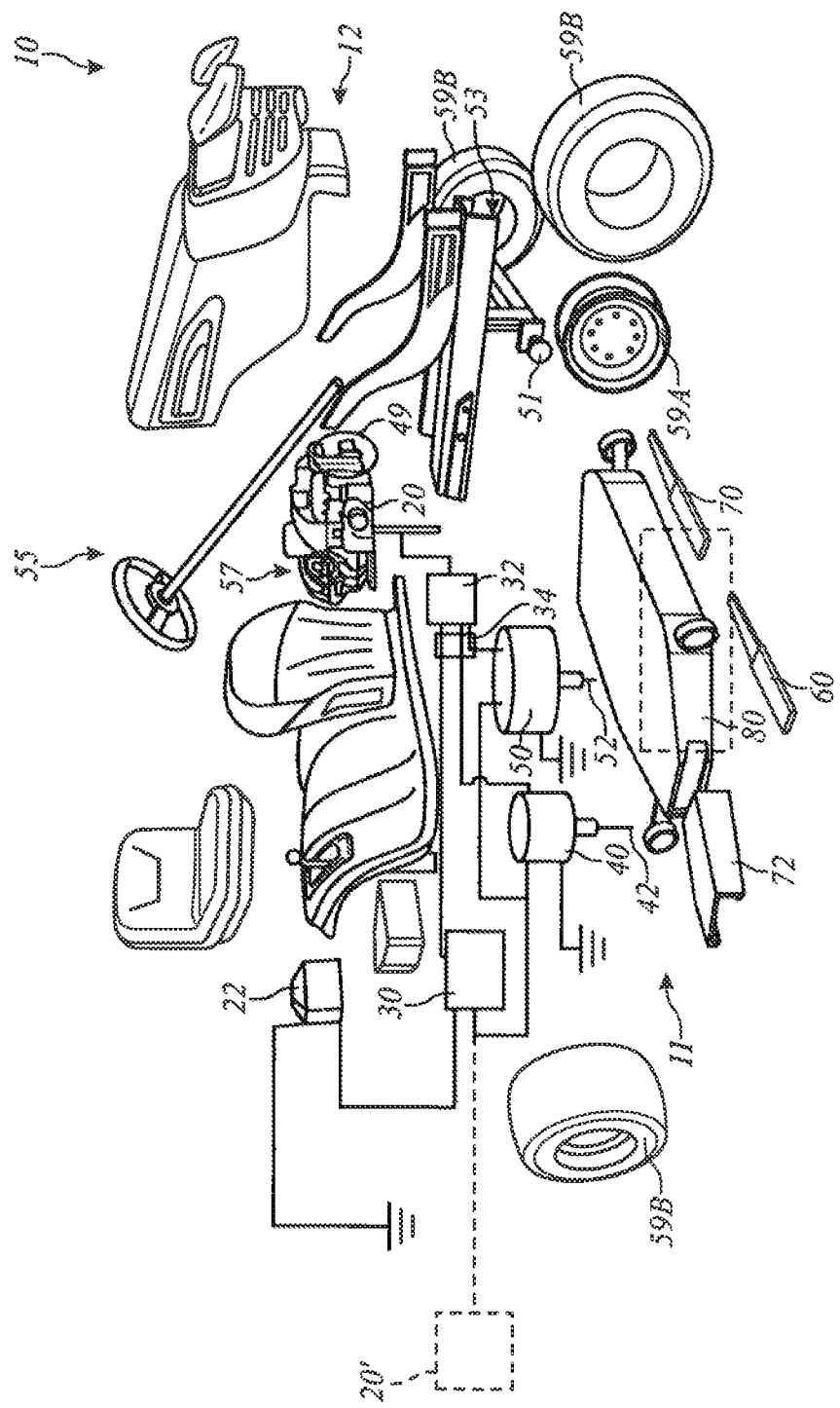
FIG. 4 is an exploded view of a hybrid mower employing an electric blade control system constructed in accordance with another example embodiment of the present disclosure.

Illustrated in FIG. 4 is an exploded view of a hybrid mower 10 having an electric blade control system 11 constructed in accordance with one example embodiment of the present disclosure. The hybrid mower 10 comprises a conventional lawn mower body 12 that takes the form of a tractor lawn mower. It should be appreciated that other types of mowers, such as zero-turn mowers could equally be adapted to be hybrid mowers 10 by employing the electric blade control system 11. The hybrid mower 10 further comprises an internal combustion engine 20 that is fueled by a hydro-carbon fuel such as gasoline, diesel, and the like. The engine 20 drives a power train to rotate the rear and/or front axles that are coupled to the wheels 59A and/or tires 59B.

Figure 3:
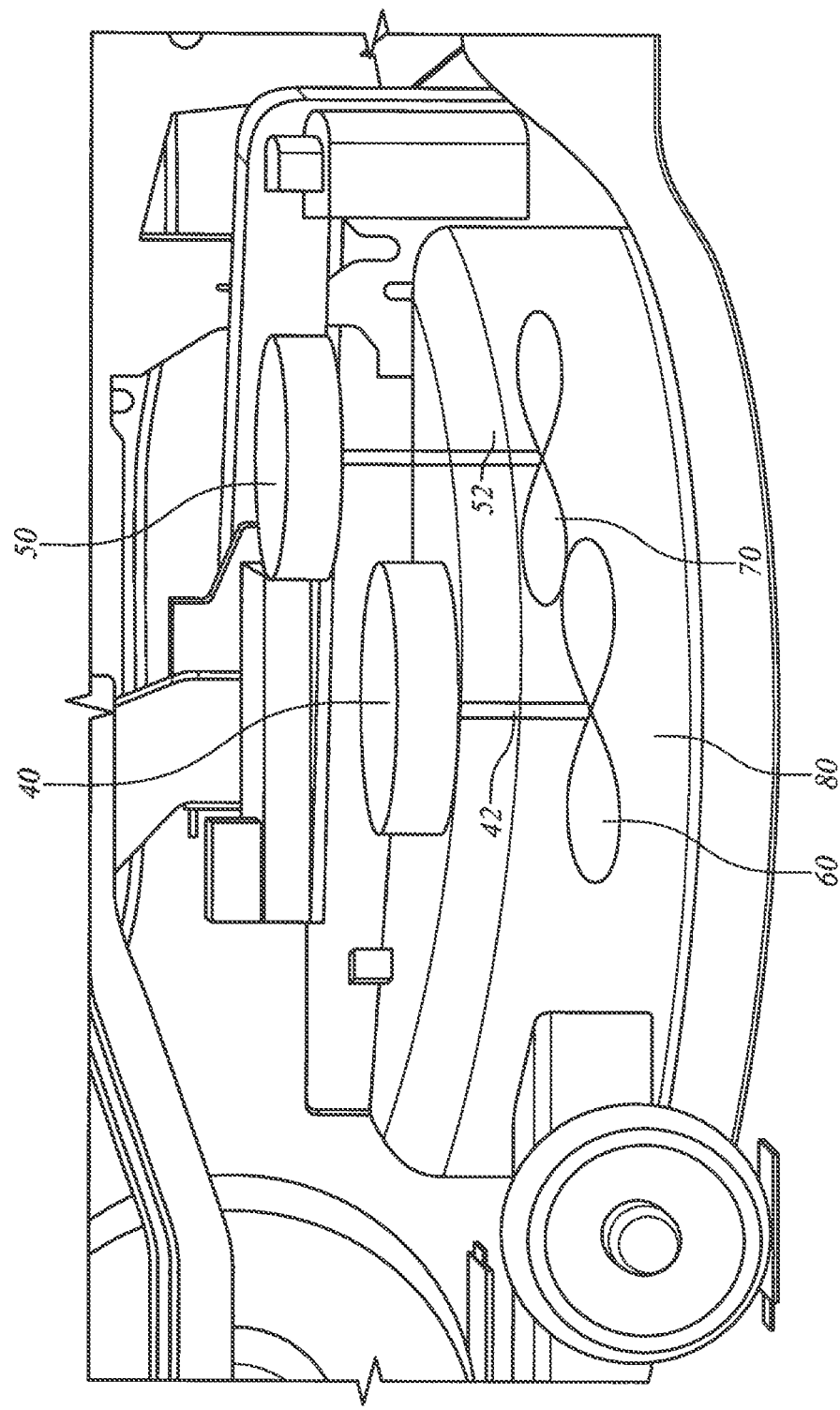
FIG. 3 is a hybrid mower with an electric blade control system constructed in accordance with one example embodiment of the present disclosure.
Figure 3A:
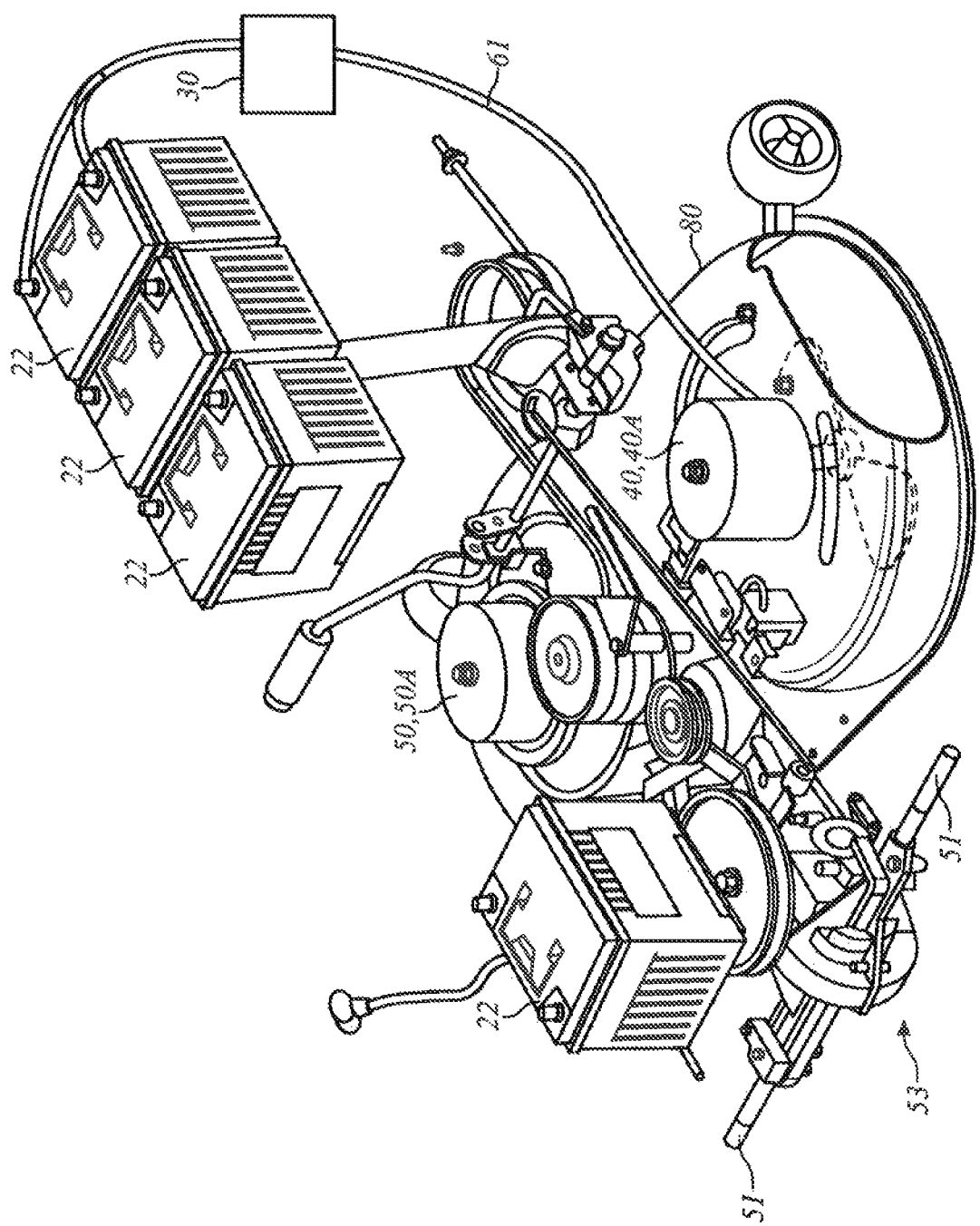
FIG. 3A is a portion of a hybrid mower with an electric blade control system constructed in accordance with one example embodiment of the present disclosure.

In the illustrated example embodiments, of FIGS. 3A and 4, the hybrid mower 10 includes a chassis 53. The chassis 53 has a plurality of wheels supports 51 coupled to a steering assembly 55 for navigating directional control. The mower 10 also includes an internal combustion engine 57 disposed on the chassis 53. The internal combustion engine 57 is coupled to a drive assembly providing rotational operation of at least one axle coupled to a set of wheels 59A and/or tires 59B. The mower 10 further includes a mower deck 80 housing at least one rotatable blade 60, 70 for cutting undesired undergrowth during operation. The hybrid mower 10 also includes a power supply 22, such as a battery that is coupled to an engine starter 33 (see FIG. 5) and responsible for activating/starting the engine 20. The power supply 22 is also coupled to an electronic control unit ("ECU") 30. The power supply 22 enables the operation of a blade starter 31 (see FIG. 5) and ECU upon activation of the engine starter 33, which comprises a starter button, turning of a key to a first position, or combination thereof. One example embodiment, the engine starter 33, once actuated, provides power to the ECU 30. Once the ECU 30 is provided power, the blades 60, 70 can be activated by engaging the blade starter 31.

Upon activation of the blade starter 31, which comprises rotating a starting key to a second position, the engagement of a power-take-off or blade operation button, or the like, the ECU 30 enables the operation of at least one DC motor, and in the illustrated example embodiment of FIG. 4, the ECU enables a first DC motor 40 and a second DC motor 50 to rotate motor shafts 42, 52, respectively. The motor shafts 42, 52 are coupled to first and second cutting blades 60 and 70, respectively. As the first and second blades, 60, 70 rotate, undergrowth is severed or cut and exhausted out a chute 72 of a mower deck 80 that is mounted and rides below the mower body 12.

The DC motors 40, 50 once enabled by the ECU 30, receive their power from a power unit 32 such as a battery bank 22, an alternator 49, and/or a combination thereof. The power unit 32 is mechanically charged by the internal combustion engine 20. The power feed from the power unit 32 is transferred through the ECU 30 first before being sent to the DC motors. The power supplied by the power unit 32 to the DC motors 40, 50 in one example embodiment is first altered, converted, or any combination thereof by circuitry and/or software 69 in the ECU 30. In the illustrated example embodiment, the electric blade control system 11 comprises the ECU 30, at least one of the first and second DC motors 40, 50, and at least one of the motor shaft 42, 52, for coupling to respective cutting blades 60, 70. The direct current motor shaft 42, 52 extends along a longitudinal axis (LA) and the rotation of the rotatable blade 60, 70 forms a cutting plane during rotation that is transverse to the longitudinal axis, and/or extends along a latitudinal axis (LAT) that is perpendicular to the longitudinal axis (LA) (see FIG. 5).

In another example embodiment, the DC motors 40, 50 drive the blades 60, 70 directly from their respective motor shafts 42, 52 that are coupled to the blades 60, 70 that form a cutting plane orthogonal to the longitudinal axis of each motor shaft, 42, 52, respectively. In yet another alternative example embodiment, the DC motors 40, 50 are powered by an additional power supply 20', such as a dedicated battery 22 on a battery bank of several batteries 22. The DC motors 40, 50 are electrically coupled to the power supply 22, the power unit 32, or additional power supply 20' via the ECU 30 and a power input 61 (e.g., a power cord). In another example embodiment, the DC motors 40, 50 are coupled to DC drives 40A, 50A, which are used to for torque control, and RPM control. It would be understood by one having ordinary skill in the art that when referring to the DC motors 40, 50 both the DC motors with and without the DC drives 40A, 50A are contemplated.

In one example embodiment, the ECU 30 is in control of and in communication with the DC motors 40, 50. In another example embodiment, the ECU 30 is in indirect communication with the DC motors 40, 50 through the DC drives 40A, 50A.

The ECU 30 comprises a microcontroller 132, an electrical circuit 136, a voltage or current meter/regulator 139, one or more sensors 135, and/or a transceiver 133. The one or more sensors 135 comprise a tachometer, a pressure sensor, shaft (rotary type) encoders, photoelectric (optical type) sensors, magnetic rotational speed (proximity type)

sensors, torque sensors, load cells, and/or a combination thereof. The transceiver 133 comprises a receiver, a transmitter, and/or a wired input/output port. The voltage or current meter comprises a voltmeter and/or an ammeter. In another example embodiment, the voltage or current meter 139 is located along the power input 61, and/or located at a power input for the DC motors 40, 50. It would be appreciated by one of ordinary skill in the art that many different microcontrollers, electrical circuits, voltage or current meters, sensors, and/or transceiver types can be utilized in this application.

In one example embodiment, a blade monitoring system 121 is operated by the electric blade control system 11 (e.g., such as by the ECU 30). The blade monitoring system 121 monitors an RPM of the DC motors 40, 50 coupled to the blades 60, 70 and increases or decreases the RPM based upon an input function (e.g., from a user), a density of the undergrowth being cut as measured by the one or more sensors 135, and/or a measured torque resistance encountered by the blades 60, 70 (e.g., stopping a rotation of one or all blades responsive to a torque, amps, or volts over a programmed threshold, such as a pressure generated by hitting a tree stump or rock). In another example embodiment, the blade monitoring system 121 decouples the RPM's of the blades 60, 70 from the speed of the hybrid mower 10 engine 20. Wherein, for example, the density of the undergrowth being cut as measured by the one or more sensors 135 (amperage, voltage, torque, and/or power) is over a first threshold, the blade monitoring system will instruct additional current be supplied to the DC motors 60, 70, from the power unit 22, rather than the merely from the power unit 32. The power unit 32 provides a current proportional to the speed of the hybrid mower 10, which in one example embodiment, the speed of the gas engine and the rotation of the blades 60, 70 are independently operated. This provides many advantages, such as allowing the blades 60, 70 to speed up without increasing the RPM, speed, or operation of the engine 20. Thus, the undergrowth can be cut with a high blade RPM independent of a hybrid tractor's 10 engine speed.

The blade monitoring system 121 monitors and stores a total amount of usage hours per blade 60, 70 and identifies a lifespan of the blades 60, 70 and/or the DC motors 40, 50. This advantageously allows the user to track maintenance intervals.

In the example embodiment, the electric blade control system 11 increases or decreases the RPM of the blades 60, 70 by controlling and monitoring an input of current from the power supply 22 and/or power unit 32. In one example embodiment, the electric blade control system 11 comprises a unidirectional current controller device (e.g., in the ECU 30), which stops current when switched into an "off" position, and allows current to flow in an "on" position. Wherein, the electric blade control system 11 comprises both a shut off function, which is triggered when the blade(s) 60, 70 interact with a force over a second force threshold, and an automatic power alteration function, wherein the electric blade control system 11 increases or decreases the RPM of the blades 60, 70 through scaling of the current being sent to the DC motors 40, 50, a sensed density of the undergrowth to be cut, and/or type of undergrowth to be cut.

Figure 5:
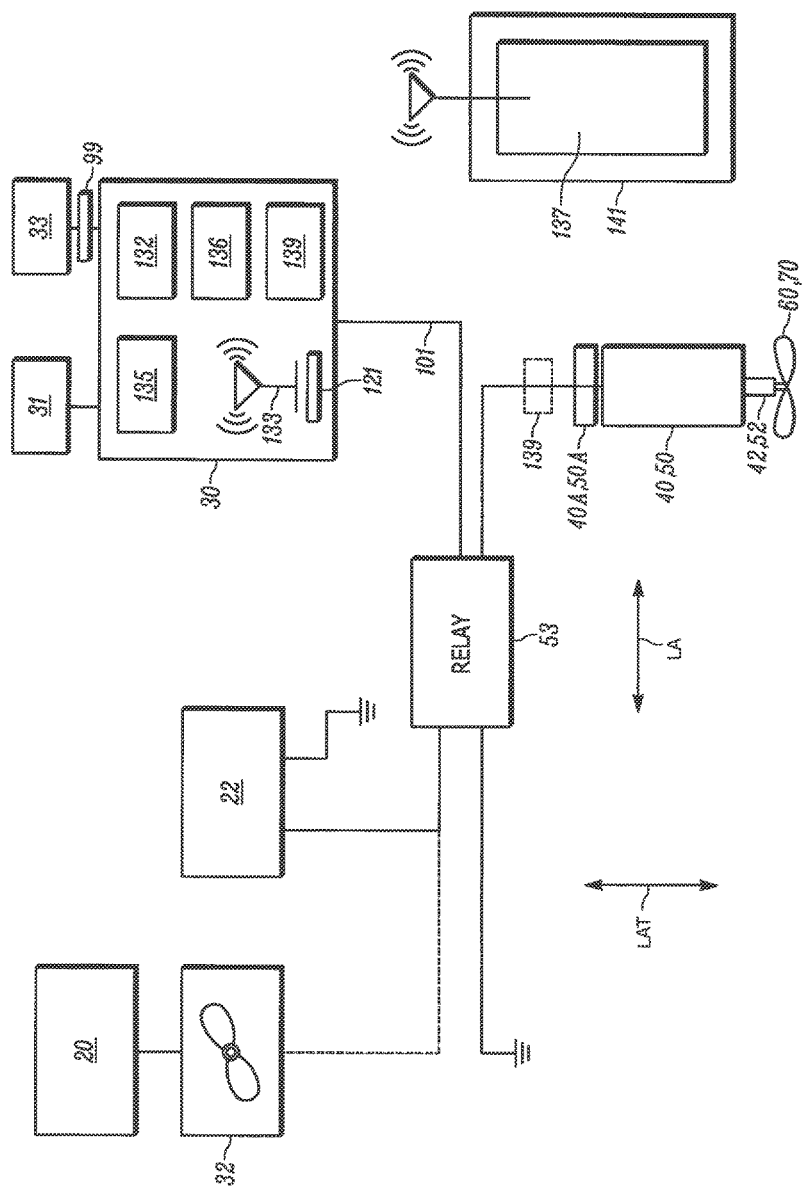
FIG. 5 is a schematic view of portions of a hybrid mower employing an electric blade control system constructed in accordance with another example embodiment of the present disclosure.

In the illustrated example embodiment of FIG. 5, the ECU 30 is in wired and/or wireless communication with an interface 137 (e.g., through communication with an I/O port of the microcontroller 132). The interface 137 can be used to view the RPM of the blades, increase the RPM independently of the engine speed, identify a lifespan of the blades 60, 70, a lifespan of the DC motors 40, 50, and/or indicate additional problems. In another example embodiment, the interface 137 is presented on a secondary device 141 in communication with the electric blade control system 121 via a short-range interconnection signal, hardwired, WIFI, and/or a personal area network.

In one example embodiment, the secondary device 139 is a remote computer system. The computer system includes desktop, laptop, tablet hand-held personal computing device, IAN, WAN, WWW, and the like, running on any number of known operating systems and are accessible for communication with remote data storage, such as a cloud, host operating computer, via a world-wide-web or Internet. In another example embodiment, the microcontroller 132 comprises a processor, data storage, computer system memory that includes read-accessible-memory ("RAM"), read-only-memory ("ROM") and/or an input/output interface. The microcontroller 132 executes instructions by non-transitory computer readable medium either internal or external through the processor, wherein the microcontroller communicates to the processor via input interface and/or electrical communications, such as from the secondary device 141 or through communication via the hybrid mower 10. In yet another example embodiment, the microcontroller 132 communicates with the Internet, a network such as a LAN, WAN, and/or a cloud, input/output devices such as flash drives, remote devices such as a smart phone or tablet, and displays such as the interface 137.

Figure 6:
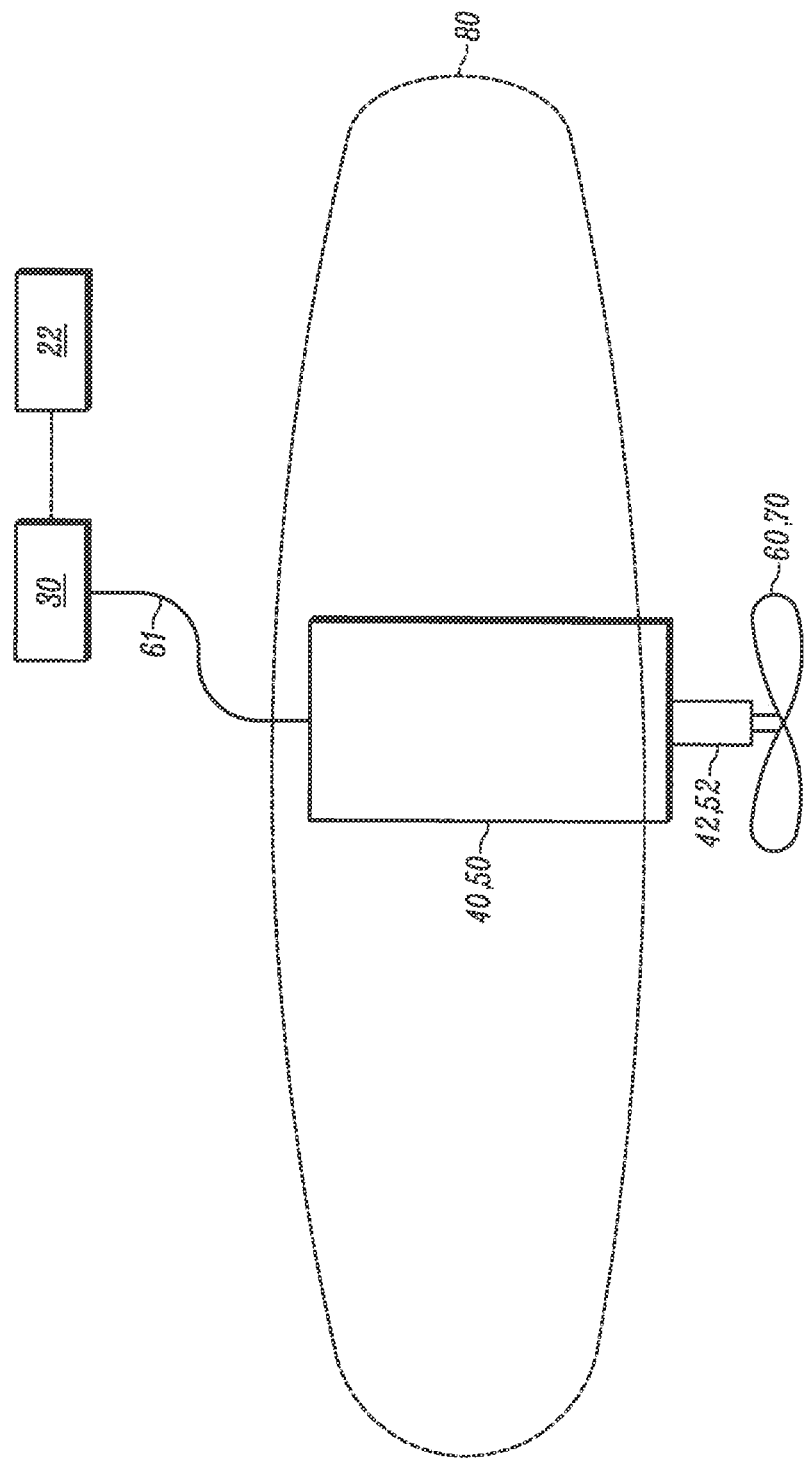
FIG. 6 is a schematic view of a replacement unit of a hybrid mower employing an electric blade control system constructed in accordance with another example embodiment of the present disclosure.

In the illustrated example embodiment of FIG. 6, a replacement unit 100 comprising the DC motors 40, 50 and the ECU 30 in control of and in communication with the DC motors 40, 50. In the illustrated example embodiment, the replacement unit 100 includes the motor shafts 42, 52a, wherein the blades 60, 70 are attachable to the motor shafts.

In the illustrated schematic example of FIGS. 5 and 6, the ECU 30 is in electrical communication with motors 40, 50, battery bank 22, motor switch 31, engine switch 33, engine throttle 99, alternator 32, DC motor drives 40A, 50A, and/or the sensors of the blade monitoring system 121, such as sensors 135. The ECU 30, through the sensors 135, provide, in one example embodiment, by alarm or LED light, an alert found on the dash of the hybrid mower. The alert is activated if a problem is experienced in the motors 40, 50, such as a higher than normal amperages, torque, under/over power requirements, and/or reduction in shaft speed.

Figure 2:
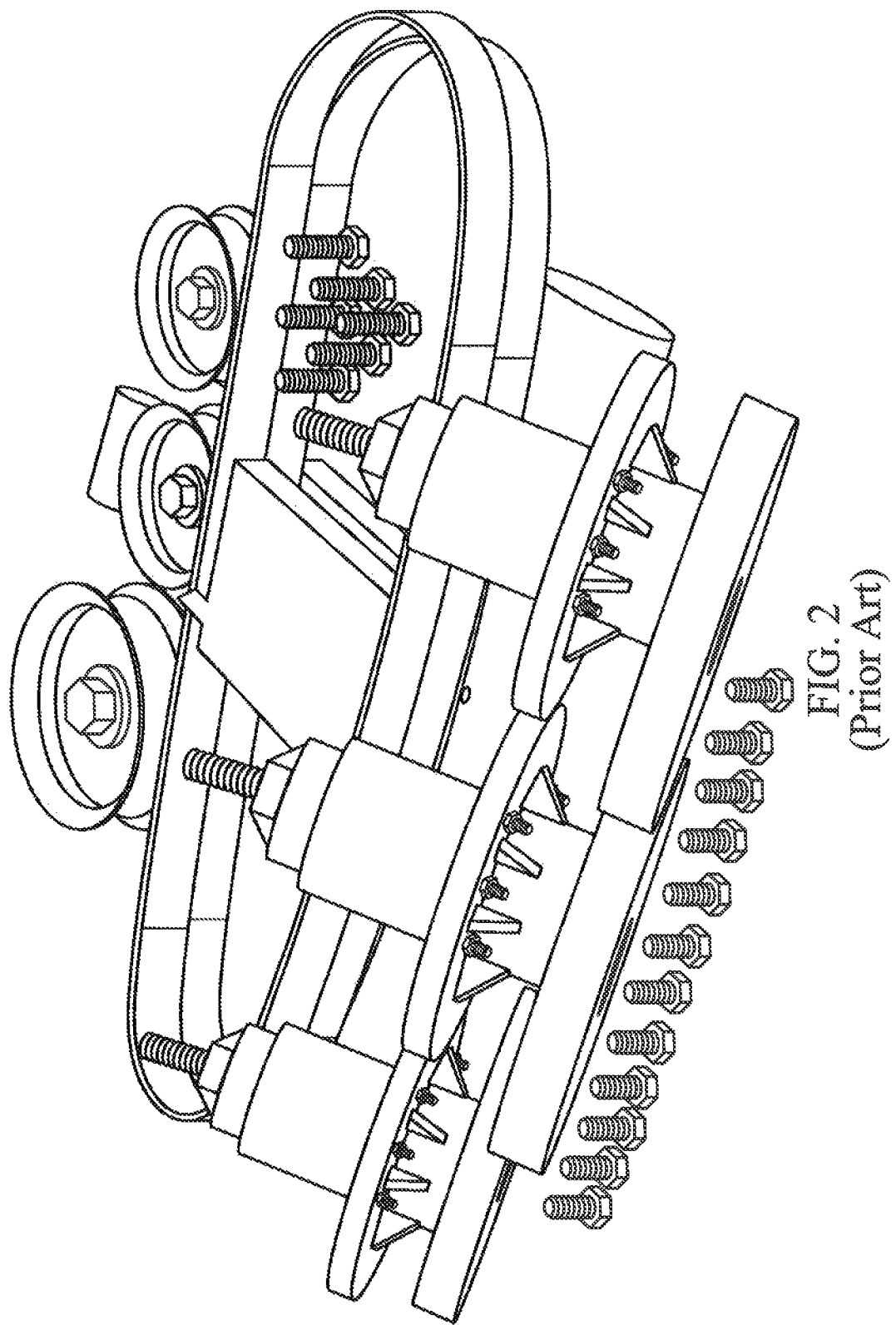
FIG. 2 is a conventional gas mower deck repair kit.
Figure 2A:
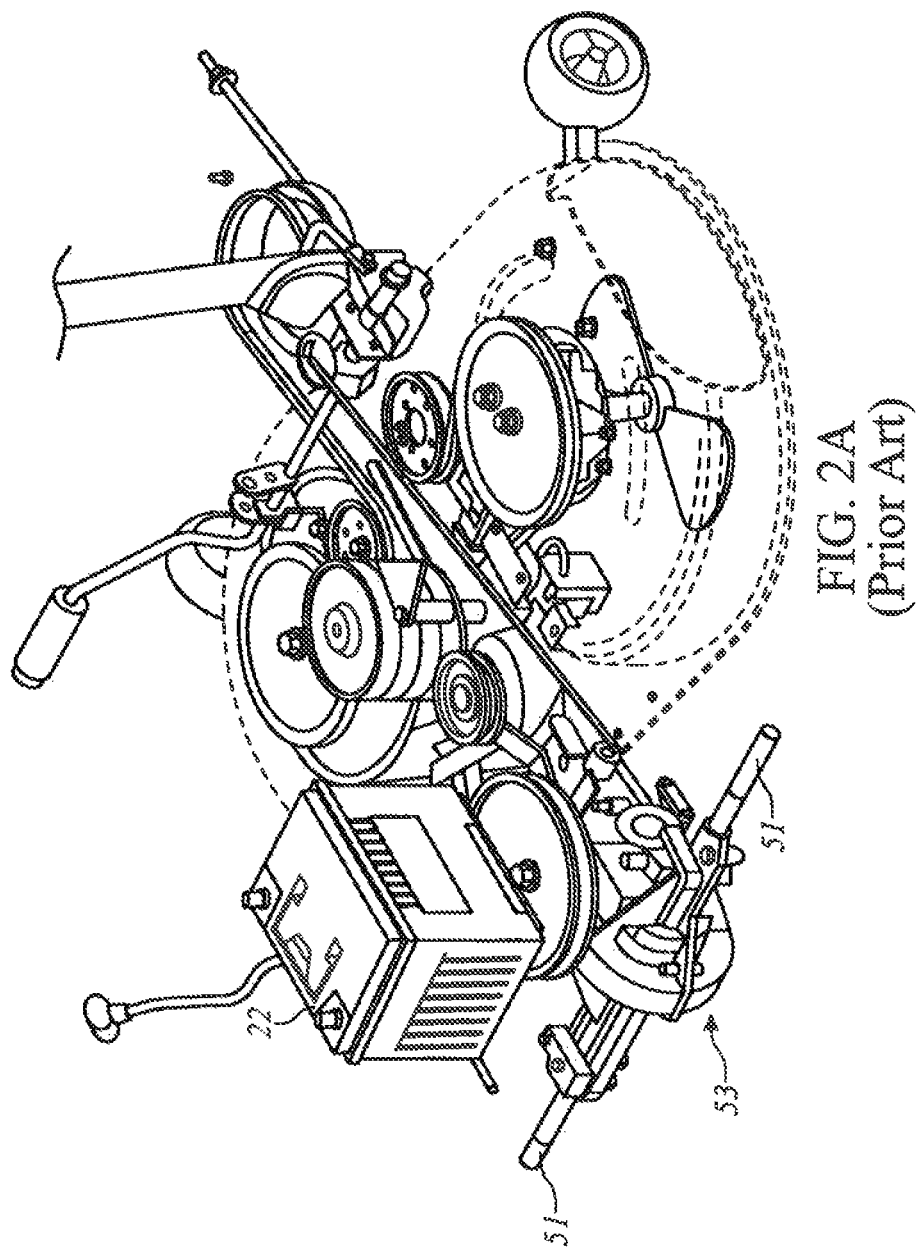
FIG. 2A is a portion of a conventional gas mower.
Figure 7:
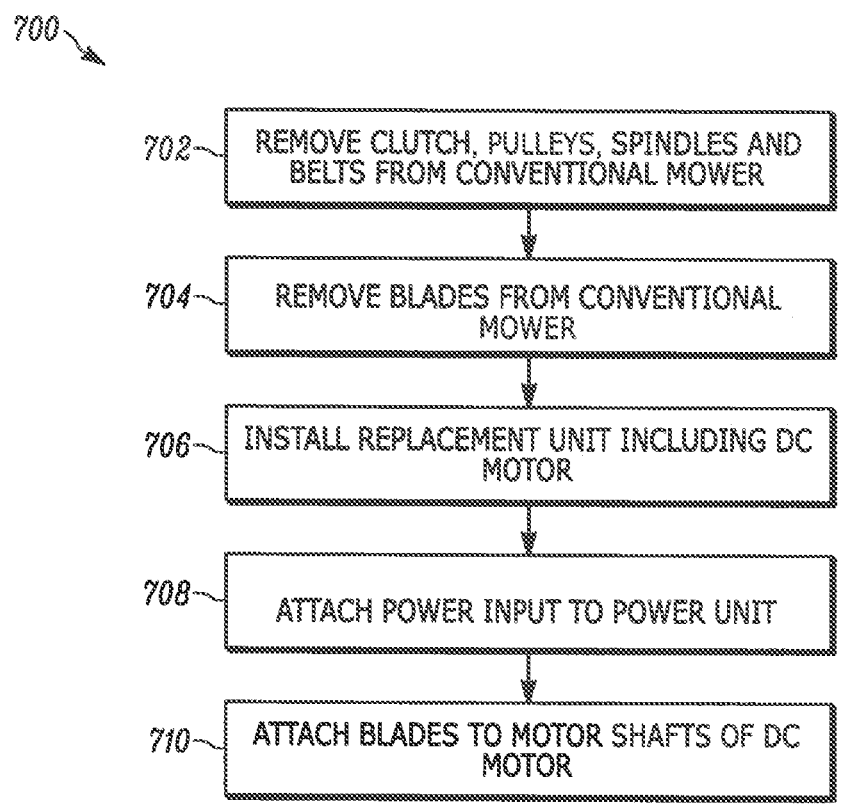
FIG. 7 is a flow diagram illustrating a method of installing a replacement unit of a hybrid mower employing an electric blade control system constructed in accordance with another example embodiment of the present disclosure.

In the illustrated example embodiment of the FIG. 7, a method of installing the replacement unit 100 is described. At 702, the clutch, pulleys, spindles, and belts (see FIGS. 1 and 2) are removed from the deck 80 of a conventional mechanical lawn mower. At 704, the blades 60, 70 are removed from the existing traditional mower. At 706, the replacement unit 100 is installed in the deck 80, wherein the DC motors 40, 50 are installed underneath or through the deck 80 and the ECU 30 is installed to the wiring harness of the hybrid mower 10 and/or an existing ECU is provided with the blade monitoring system 121. At 708, the power input 61, which supplies power to the ECU 30 and the DC motors 40, 50, is coupled to the power supply 22, power unit 32 and/or to the blade starter 31. In one example embodiment, the power input 61 is coupled to the power supply 22 and/or the power unit 32 via a relay 53. In another example embodiment, the voltage or current meter 139 is installed along the power input 61 and/or is in communication with the ECU 30. At 710, the blades 60, 70 are coupled to the motor shafts 42, 52 of the DC motors 40, 50, respectively, wherein the electric blade control system 11 is installed into the hybrid mower 10.

Figure 8:
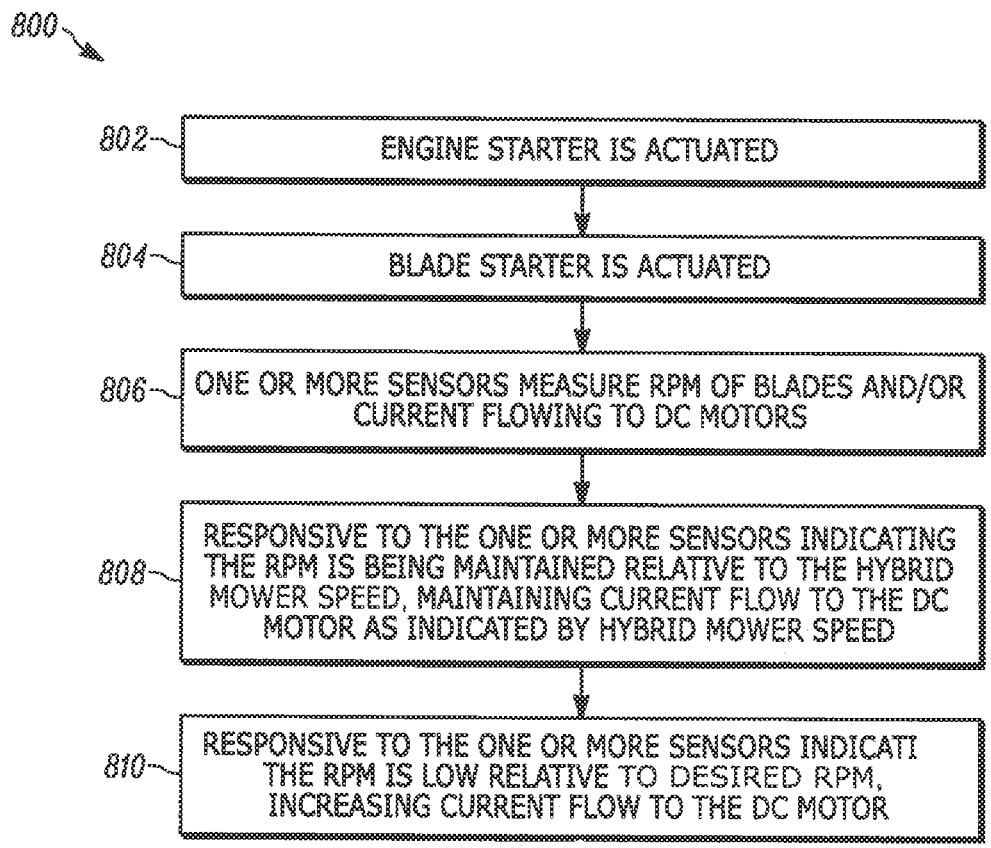
FIG. 8 is a flow diagram illustrating a method of using an installed replacement unit and/or a hybrid mower employing an electric blade control system constructed in accordance with another example embodiment of the present disclosure Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

In the illustrated example embodiment of the FIG. 8, a method of using the installed replacement unit 100 and/or the hybrid mower 10 is described. At 802, the engine starter 33 is actuated, and thus the engine 20 is activated and the blade starter 31 is provided power. At 804, the blade starter is activated which provides a signal to the electric blade control system 11 to start the DC motors 40, 50, by supplying current to the DC motors 40, 50 from the power unit 32, or the power supply 22. At 806, at least one of the one or more sensors 135 is measuring the RPM of the blades 60, 70 and/or the voltage or current meter 139 is measuring a current being sent to the DC Motor 40, 50 and transmitting the measurement to the ECU 30 (e.g., the microcontroller 132). In one example embodiment at least one of the tachometer, shaft encoders, photoelectric sensors and magnetic rotational speed sensors are measuring the RPM of the blades 60, 70. At 808, responsive to the one or more sensors 135 signaling to the ECU 30 that the RPM is being maintained proportionally to a desired RPM 10 (e.g., through comparing the current flowing to the DC motors 40, 50 relative to the RPM, wherein the amount of current, absent an outside force, determines the RPM, or having a predetermined RPM for a given speed of the hybrid mower 10), the ECU maintains the current level being transmitted to the DC motors 40, 50.

At 810, responsive to the one or more sensors 135 signaling to the ECU 30 that the RPM is lowering proportionally to the desired RPM (e.g., such as when the area sought to be mowed/cut is dense, or robust), the ECU increases the current level being transmitted to the DC motors 40, 50, without increasing the speed of the engine 20 or the hybrid mower 10. In one example embodiment, wherein the RPM of the blades 60, 70 is proportional to the current being supplied to the DC motors 40, 50, the current increase is provided by the power supply 22. In another example embodiment, the ECU 30 scales the current back (e.g., what is being output by the power unit 32) such that the RPM conform to a desired RPM, responsive to the RPM exceeding the expected RPM for a given current input.

The electric blade control system 11 advantageously eliminates the need for a clutch, pulleys, spindles, and belts (see FIGS. 1 and 2) required in conventional mechanical lawn mowers, zero-turn mowers, and tractor mower systems. Thus, the stress on the engine 20 the mower 10 having the electric blade control system 11 is reduced during operation, eliminating the need to run the engine at full throttle (for the power needed to cut the grass drawn from the engine in conventional systems), improving the engine's life and fuel efficiency. Additionally, as the electric blade system 11 decouples, when advantageous, the blade speed (RPM) from the engine speed, the stress on the engine is further reduced, while efficiency of mowing is increased. Driving the blades 60, 70 by DC motors 40, 50 allows full control of the blade speeds through the ECU 30 as well as the acceleration and deceleration of the blades, independently from the operation of the engine 20. The electric blade control system 11 further advantageously reduces the repair and assembly time during production at the factory because of the reduced number of parts.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A hybrid mower comprising:
   a chassis coupled to a body, the chassis having a plurality of wheels coupled to a steering assembly for navigating directional control;
   an internal combustion engine disposed on said chassis, the internal combustion engine coupled to a drive assembly providing rotational operation to at least one of said plurality of wheels;

a mower deck housing at least one rotatable blade for cutting undesired undergrowth during operation; and an electric blade control system comprising:
 one or more sensors which identify a density of a material to be cut;
 an electronic control unit for enabling the at least one rotatable blade during operation;
 at least one direct current motor positioned about said mower deck and the direct current motor is in communication with the electronic control unit;
 the at least one direct current motor having a motor shaft coupled to said at least one rotatable blade; and
 wherein, responsive to the one or more sensors identifying the density of the material to be cut as over a first threshold, the electronic control unit increasing a direct current motor speed of rotation of at least one rotatable blade.

2. The hybrid mower of claim 1 wherein said at least one direct current motor shaft includes a longitudinal axis and the rotation of said at least one rotatable blade forms a cutting plane during rotation that is transverse to said longitudinal axis.

3. The hybrid mower of claim 1 wherein said at least one direct current motor shaft includes a longitudinal axis and the rotation of said at least one rotatable blade forms a cutting plane during rotation that is perpendicular to said longitudinal axis.

4. The hybrid mower of claim 1 wherein said electronic control unit further controls the acceleration and deceleration of said at least one direct current motor.

5. The hybrid mower of claim 1 wherein said an electric blade control system further comprises an alternator for providing power to at least one battery.

6. The hybrid mower of claim 1 wherein said an electric blade control system further comprises a dedicated battery for supplying power to said at least one direct current motor.

7. The hybrid mower of claim 1 wherein the electronic control unit is in communication with one or more sensors that measure a measured RPM of the at least one rotatable blade.

8. The hybrid mower of claim 7 wherein the electronic control unit alters an amount of current that is supplied to the at least one direct current motor based upon the current RPM of the at least one rotatable blade.

9. The hybrid mower of claim 1 wherein a battery provides a first current flow rate to the at least one direct current motor, wherein the first current flow, absent a force over a force threshold, causes the at least one direct current motor to operate at a first RPM, wherein the first RPM is a function of the first current flow rate.

10. The hybrid mower of claim 9 wherein at least one sensor measures a current RPM of the at least one direct current motor, and wherein the at least one sensor electronically communicates the current RPM to the electronic control unit.

11. The hybrid mower of claim 10 wherein responsive to the at least one rotatable blade encountering the force over the force threshold, which causes the at least one direct current motor to operate at a second RPM as measured by the at least one sensor, wherein the second RPM is lower than the first RPM, the electronic control unit increases an amount of current that is supplied to the at least one direct current motor until the direct current motor is rotating at the first RPM.

12. The hybrid mower of claim 10 wherein responsive the at least one direct current motor operating at a third RPM as measured by the at least one sensor, wherein the third RPM is higher than the first RPM, the electronic control unit decreases an amount of current that is supplied to the at least one direct current motor until the direct current motor is rotating at the first RPM.

13. The hybrid mower of claim 10 wherein said electric blade control system further comprises a motor speed throttle that operates the speed of the at least one direct current motors independently from a speed of the internal combustion engine.

14. A hybrid mower replacement unit for installing into a mower comprising:
 at least one direct current motor having a motor shaft, the motor shaft for coupling to one rotatable blade of an existing gas power mower, the rotatable blade for cutting undesired undergrowth during operation, the at least one direct current motor for positioning about a mower deck supported by a chassis coupled to a body, the chassis having a plurality of wheels coupled to a steering assembly for navigating directional control, wherein an internal combustion engine disposed on said chassis, the internal combustion engine coupled to a drive assembly providing rotational operation to at least one of said plurality of wheels;
 an electronic control unit for enabling the at least one motor shaft during operation, wherein the electronic control unit is in communication with the direct current motor, further wherein the electronic control unit is for controlling a current flow from at least one of a power unit and power supply.

15. The hybrid mower replacement unit of claim 14 wherein said electronic control unit further controls the acceleration and deceleration of said at least one direct current motor.

16. The hybrid mower replacement unit of claim 14 wherein the electronic control unit alters an amount of current that is supplied to the at least one direct current motor based upon the current RPM of the at least one rotatable blade.

17. The hybrid mower replacement unit of claim 14 wherein the electronic control unit is for controlling a power supply comprising a dedicated battery for supplying power to said at least one direct current motor.

18. The hybrid mower replacement unit of claim 14 further comprising one or more sensors that measure a current RPM of the motor shaft and one or more sensors for monitoring the power unit output when installed, wherein the electronic control unit is for altering the RPM of the motor shaft independently of the power unit output.

19. The hybrid mower replacement unit of claim 14 wherein said at least one direct current motor shaft includes a longitudinal axis, wherein when attached the rotation of said at least one rotatable blade forms a cutting plane during rotation that is transverse to said longitudinal axis.

20. An electrically-powered mower unit replacement kit for installation on a mower to replace a gas-powered mower unit of the mower, the mower including: a chassis coupled to a body, the chassis having a plurality of wheels coupled to a steering assembly for navigating directional control; an internal combustion engine disposed on said chassis, the internal combustion engine coupled to a drive assembly providing rotational operation to at least one of said plurality of wheels; and a mower deck housing including a rotatable blade for cutting undesired undergrowth during operation, the electrically-powered mower replacement kit comprising:

an electric power source mountable to the mower;
an electronic control unit including a blade monitoring system mountable to the mower and electrically coupled to the electric power source;
a direct current motor mountable to the mower deck and electrically coupled to the electronic control unit, the electronic control unit controlling a current flow from the electric power source to the direct current electric motor, the direct current electric motor including a motor shaft for coupling to and rotating the rotatable blade of the mower under the control of the electronic control unit; and
a first sensor coupled to the direct current motor for monitoring an RPM of the motor shaft of the direct current motor and a second sensor coupled to the electric power source for monitoring the current flow from the electric power source to the direct current electric motor.

\* \* \* \* \*